(12) United States Patent
Rupprecht et al.

(10) Patent No.: US 11,099,882 B2
(45) Date of Patent: Aug. 24, 2021

(54) CONTAINER OPTIMIZATION THROUGH AUTOMATIC LAYER SUGGESTIONS

(71) Applicant: International Business Machines Corporation, Armonk, NY (US)

(72) Inventors: Lukas Rupprecht, San Jose, CA (US); Dimitrios Skourtis, Santa Cruz, CA (US); Vasily Tarasov, Moorpark, CA (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/583,316

(22) Filed: Sep. 26, 2019

(65) Prior Publication Data

US 2021/0096894 A1 Apr. 1, 2021

(51) Int. Cl.
*G06F 9/455* (2018.01)
*G06F 9/50* (2006.01)

(52) U.S. Cl.
CPC ...... *G06F 9/45558* (2013.01); *G06F 9/45545* (2013.01); *G06F 9/5077* (2013.01)

(58) Field of Classification Search
CPC . G06F 9/45558; G06F 9/45545; G06F 9/5077
See application file for complete search history.

(56) References Cited

U.S. PATENT DOCUMENTS

| 10,853,185 | B1* | 12/2020 | Guo | G06F 11/1451 |
| 2017/0351695 | A1* | 12/2017 | Rao | G06F 21/6218 |
| 2018/0088926 | A1* | 3/2018 | Abrams | H04L 67/34 |
| 2018/0095973 | A1* | 4/2018 | Huang | G06F 8/63 |
| 2018/0189121 | A1* | 7/2018 | Jobi | G06F 9/5016 |
| 2018/0196654 | A1* | 7/2018 | Bo | G06F 8/60 |
| 2018/0267990 | A1 | 9/2018 | Cherukuri | |
| 2018/0275987 | A1* | 9/2018 | Vandeputte | G06F 8/71 |

(Continued)

FOREIGN PATENT DOCUMENTS

| EP | 3376383 A1 | 9/2018 |
| WO | 2017106726 A1 | 6/2017 |

OTHER PUBLICATIONS

"DockerSlim", GitHub, Minify and Secure Docker containers (free and open source!), printed on Jun. 20, 2019, 15 pages, <https://github.com/docker-slim/docker-slim>.

(Continued)

*Primary Examiner* — Dong U Kim
(74) *Attorney, Agent, or Firm* — Randy E. Tejeda (57) ABSTRACT

In an approach to optimizing container images through automatic layer suggestions, one or more computer processors identify one or more layers contained within an image. The one or more computer processors compare each identified layer with one or more layers contained in an image repository. The one or more computer processors calculate a layer overlap score for each compared layer. The one or more computer processors determine a potential substitute layer utilizing a respective calculated layer overlap score. The one or more computer processors, responsive to the determined substitute layer exceeding a layer overlap score threshold, substitute one or more identified layers with the determined substitute layer. The one or more computer processors restructure one or more layers of the image based on the substituted layer.

20 Claims, 5 Drawing Sheets

(56) References Cited

U.S. PATENT DOCUMENTS

2019/0384679 A1* 12/2019 Parambil ............. G06F 9/45558
2020/0082094 A1*  3/2020 Mcallister ................ G06F 8/73
2020/0359451 A1* 11/2020 Reno ................ H04W 12/0431

OTHER PUBLICATIONS

D'Urso et al., "Wale: A Dockerfile-based approach to deduplicate shared libraries in Docker containers", 2018 IEEE 16th International Conference on Dependable, Autonomic and Secure Computing, Computing 4th International Conference on Big Data Intelligence and Computing and Cyber Science and Technology Congress (DASC/PiCom/DataCom/CyberSciTech,) IEEE, 2018, 7 pages.

Hajnal et al., "ENTICE VM Image Analysis and Optimised Fragmentation,", Journal of Grid Computing, Published online: Feb. 21, 2018, © Springer Science+Business Media B.V., part of Springer Nature 2018, 7 pages.

Hardi et al., "Making Containers Lazy with Docker and CernVM-FS," ACAT2017, Journal of Physics: Conference Series, v.1085, n.3, IOP Publishing, 2018, 7 pages.

Zheng et al., "Wharf: Sharing Docker Images in a Distributed File System", Proceedings of the ACM Symposium on Cloud Computing (SoCC '18), Oct. 11-13, 2018, Carlsbad, CA, USA, pp. 174-185, ACM.

* cited by examiner

```
Input: set of image layers L, set of registry layers M, threshold t > 0 result = ∅; maxOverlap = 0; substLayer = ∅ for l in L:
    for m in M:
        if |l ∩ m| > t AND |l ∩ m| > maxOverlap:
            maxOverlap = |l ∩ m|
            substLayer = m
    result = result ∪ {substLayer}
    substLayer = ∅
    maxOverlap = 0

R = ∪L \ ∪result
W = ∪result \ ∪L
result = result ∪ R

Create whiteout layer WL from W
result = result ∪ WL

Output: result
```

FIG. 4A

```
Input: set of already processed layers P, substitution layer m, matched layer l canMatch = true
w = m \ l
if w != ∅
    for p in P:
        if w ∩ p != ∅
            canMatch = false
            break
return canMatch
```

CONTAINER OPTIMIZATION THROUGH AUTOMATIC LAYER SUGGESTIONS

BACKGROUND

The present invention relates generally to the field operating system virtualization, and more particularly to containerization.

OS-level virtualization refers to an operating system paradigm in which the kernel allows the existence of multiple isolated user-space instances. Such instances, called containers, zones, virtual private servers, partitions, virtual environments, virtual kernel or jails, may look like real computers from the perspective of the contained programs. A computer program running on an ordinary operating system can see all resources (connected devices, files and folders, network shares, CPU power, quantifiable hardware capabilities) of that computer, however, programs running inside of a container can only see the contents of the container and devices assigned to the container. Operating-system-level virtualization is commonly used in virtual hosting environments, where it is useful for securely allocating finite hardware resources among a large number of independent users. System administrators may also use it for consolidating server hardware by moving services on separate hosts into containers on a single host (e.g., server). Containers are commonly used for improved security, hardware independence, and added resource management features. Operating-system-level virtualization implementations capable of live migration can also be used for dynamic load balancing of containers between nodes in a cluster. Operating-system-level virtualization usually imposes less overhead than full virtualization because programs in virtual partitions use the normal system call interface of the operating system and do not need to be subjected to emulation or be run in an intermediate virtual machine, as is the case with full virtualization and paravirtualization. This form of virtualization also does not require hardware support for efficient performance.

Operating-system-level virtualization is not as flexible as other virtualization approaches (e.g., containerization) since it cannot host a guest operating system different from the host one, or a different guest kernel. Some implementations provide file-level copy-on-write (CoW) mechanisms. Most commonly, a standard file system is shared between partitions, and those partitions that change the files automatically create copies. This is easier to back up, more space-efficient, and simpler to cache than the block-level copy-on-write schemes common on whole-system virtualization. Whole-system virtualization, however, can work with non-native file systems and create and roll back snapshots of the entire system state.

SUMMARY

Embodiments of the present invention disclose a computer-implemented method, a computer program product, and a system for optimizing container images through automatic layer suggestions. The computer-implemented method includes one or more computer processors identifying one or more layers contained within an image. The one or more computer processors compare each identified layer with one or more layers contained in an image repository. The one or more computer processors calculate a layer overlap score for each compared layer. The one or more computer processors determine a potential substitute layer utilizing a respective calculated layer overlap score. The one or more computer processors, responsive to the determined substitute layer exceeding a layer overlap score threshold, substitute one or more identified layers with the determined substitute layer. The one or more computer restructure one or more layers of the image based on the substituted layer.

DETAILED DESCRIPTION

Containers are prevalent in information technology and development operations deployments, servers, and systems. Containers allow for the rapid creation, modification, suspension, and deletion of one or more applications in a virtualized environment. Traditionally, containers contain a plurality of layers that can be shared with other containers in an attempt to reduce storage utilization in image registries, on container hosts, and deployment servers. Unfortunately, most layers in containers are unique, thus cannot be shared with other containers, forcing registries to house multiple versions of highly similar layers, thus increasing the required amount of storage space for each registry entry (e.g., stored image).

Embodiments of the present invention allow for improved layer shareability by automatically providing suggestions regarding layer restructuration when creating or pushing an image. Embodiments of the present invention allow for maximum layer shareability by recognizing overlapping layers and restructuring the container to take advantage of the overlap. Some embodiments of the present invention recognize that system requirements such as memory and hard drive utilization are reduced when containers increase the number of shared layers. Some embodiments of the present invention recognize that further container optimization is achieved by container restructuration utilizing automatic layer suggestions. Implementation of embodiments of the invention may take a variety of forms, and exemplary implementation details are discussed subsequently with reference to the Figures.

The present invention will now be described in detail with reference to the Figures.

Figure 1:
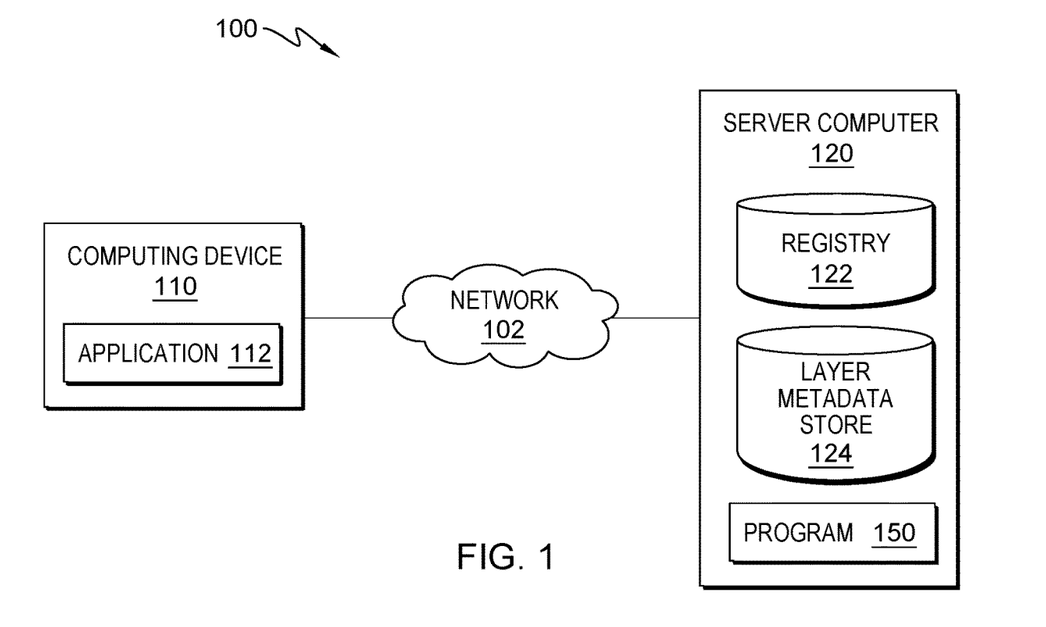
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 5, in accordance with embodiments of the present invention. In the depicted embodiment, computing device 110 contains application 112.

Application 112 is a set of one or more programs designed to carry out the operations for a specific application to assist a user to perform an activity (e.g., word processing programs, spread sheet programs, media players, web browsers). In the depicted embodiment, applications 112 is a set of one or more programs designed to assist in container management and orchestration. Application 112 allows a user to view all running containers, push commands into containers, add containers, remove containers, and modify containers. In an embodiment, application 112 provides a web graphical interface, allowing one or more users to access and manage the system. In another embodiment, application 112 provides an application programming interface (API) for creating, running, and modifying one or more containers. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes registry 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 5.

Registry 122 is a repository for data used by program 150. In the depicted embodiment, registry 122 resides on server computer 120. In another embodiment, registry 122 may reside on computing device 110 or elsewhere within distributed data processing environment 100 provided program 150 has access to registry 122. A database is an organized collection of data. Registry 122 can be implemented with any type of storage device capable of storing data and configuration files that can be accessed and utilized by program 150, such as a database server, a hard disk drive, or a flash memory. Registry 122 allows a plurality of users the ability to push images into the registry and allow other users can download the images from registry 122. Registry 122 allows the same container (e.g., application, program, etc.) to be shipped from a user to another. In an embodiment, registry 122 assigns role-based access control (RBAC) to the images using a user identity already established in an organization, such as LDAP and Active Directory. For additional security layers, images are digitally signed to ensure their authenticity from trusted users. In another embodiments, registered images are scanned for vulnerabilities and patched accordingly. In an embodiment, registry 122 stores data used by program 150, such as historical containers and historical images. In various embodiments, registry 122 contains one or more stored images that are decomposed into sets of individual layers that comprise each image. In this embodiment, each decomposed layer is associated with a metadata entry contained in layer metadata store 124. In an embodiment, registry 122 contains layer metadata store 124.

Layer metadata store 124 is a repository for metadata used by program 150. Layer metadata store 124 contains a plurality of sets of metadata for each container or image created, pushed, shared, and modified by program 150. In an embodiment, the contained metadata includes, but is not limited to, layer IDs, hashes, related layers, software, containers, file structures, filenames, folder names, parent folders, subfolders, associated permissions, creation dates, modified dates, symbolic links, file sizes, folder sizes, file types, hidden files, hidden folders, associated inodes and v-nodes. Layer metadata store 124 maintains entries for each image, container, layer, software, application, or program that program 150 detects, compares, decomposes, encounters, scans, identifies, or retrieves. Layer metadata store 124 stores and maintains the filesystem structure and associated metadata of any entries contained therein Program 150 is a program for optimizing container images through automatic layer suggestions. In various embodiments, program 150 may implement the following steps: identify one or more layers contained within an image; compare each identified layer with one or more layers contained in an image repository; calculate a layer overlap score for each compared layer; determine a potential substitute layer utilizing a respective calculated layer overlap score; responsive to the determined substitute layer exceeding a layer overlap score threshold, substitute one or more identified layers with the determined substitute layer; restructure one or more layers of the image based on the substituted layer. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within distributed data processing environment 100. Program 150 is depicted and described in further detail with respect to FIG. 2.

The present invention may contain various accessible data sources, such as registry 122 and layer metadata store 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
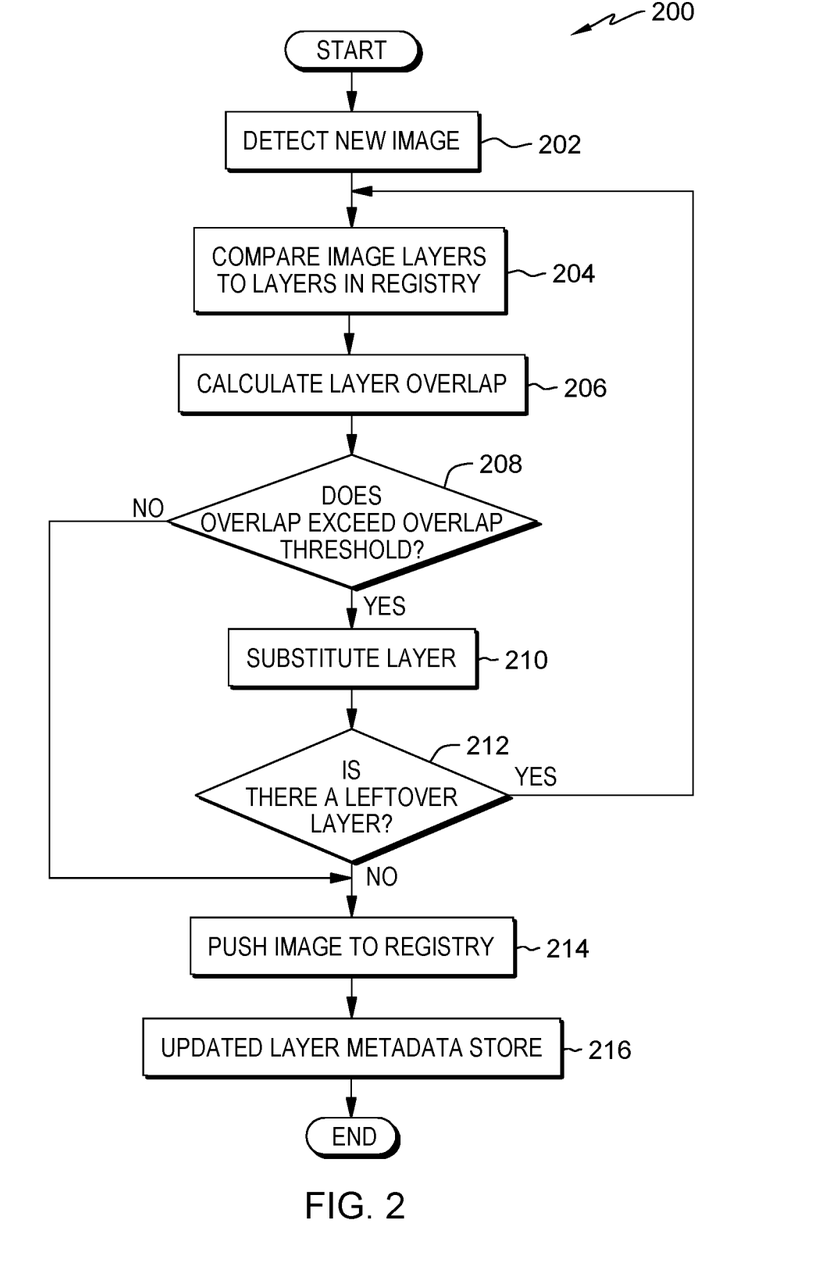
FIG. 2 is a flowchart depicting operational steps of a program, on a server computer within the data processing environment of FIG. 1, for optimizing container images through automatic layer suggestions, in accordance with an embodiment of the present invention.

FIG. 2 is a flowchart depicting operational steps of program 150 for optimizing container images through automatic layer suggestions, in accordance with an embodiment of the present invention.

Program 150 detects a new image (step 202). Program 150 monitors registry 122 or is notified by registry 122 when a user pushes an image or when a user modifies an image stored within registry 122. In various embodiments, program 150 acts as an inline proxy and/or a transparent proxy 'sitting' in between a computing device and the destination registry (e.g., registry 122). In this embodiment, all network traffic to and from the computing device and registry 122 will travel through program 150. In another embodiment, program 150 monitors application (e.g., application 112) activity to determine a network request (e.g., image push or image modification). In an embodiment, program 150 identifies a pushed image and pauses, delays, or halts the push (e.g., image storage) until one or more layer optimizations have completed. In various embodiments, program 150 receives a notification, along with associated information and metadata, regarding a new pushed or stored image. In an embodiment, program 150 transmits a request (e.g., command, etc.) to a plurality of platform-as-a-service products and container management/orchestration applications, known in the art, to return or output a list of all containers. In an embodiment, program 150, automatically, optimizes all images contained, referenced, or stored within an image repository such as registry 122.

Program 150 compares image layers to layers in the registry (step 204). Responsive to program 150 detecting a pushed or modified image, program 150 identifies one or more sets of layers contained within a container image (e.g., pushed image). Each layer contains one or more sets of files/folders and when combined form the container root file system. In an embodiment, layers are read-only and can be shared equally across related images and containers. For example, an open-source operating system distribution can be transformed into an initial layer where applications and services can be installed on top, forming new additional layers. Program 150 decomposes the container into distinct individual layers. For example, initially, program 150 extracts the base layer level, typically the operating system filesystem, and leaves all other files (e.g., files not associated with the operating system). In various embodiments, program 150 creates a plurality of sets comprising distinctly structured and organized layers. For example, in an example situation of a container containing a webserver, program 150 may create two sets of layers for one container (e.g., image), containing the operating system and webserver in distinct layers and another set containing both the operating system and webserver in one, cohesive layer. In an embodiment, program 150 creates and attaches (e.g., layer metadata store 124) a layer ID (e.g., layer hash) that uniquely identifies the files and applications contained therein. In another embodiment, program 150 combines all existing layers within a container image into one layer, allowing program 150 to infer and create new layers based on existing layers, filesystems, images, and containers.

Figure 4A:
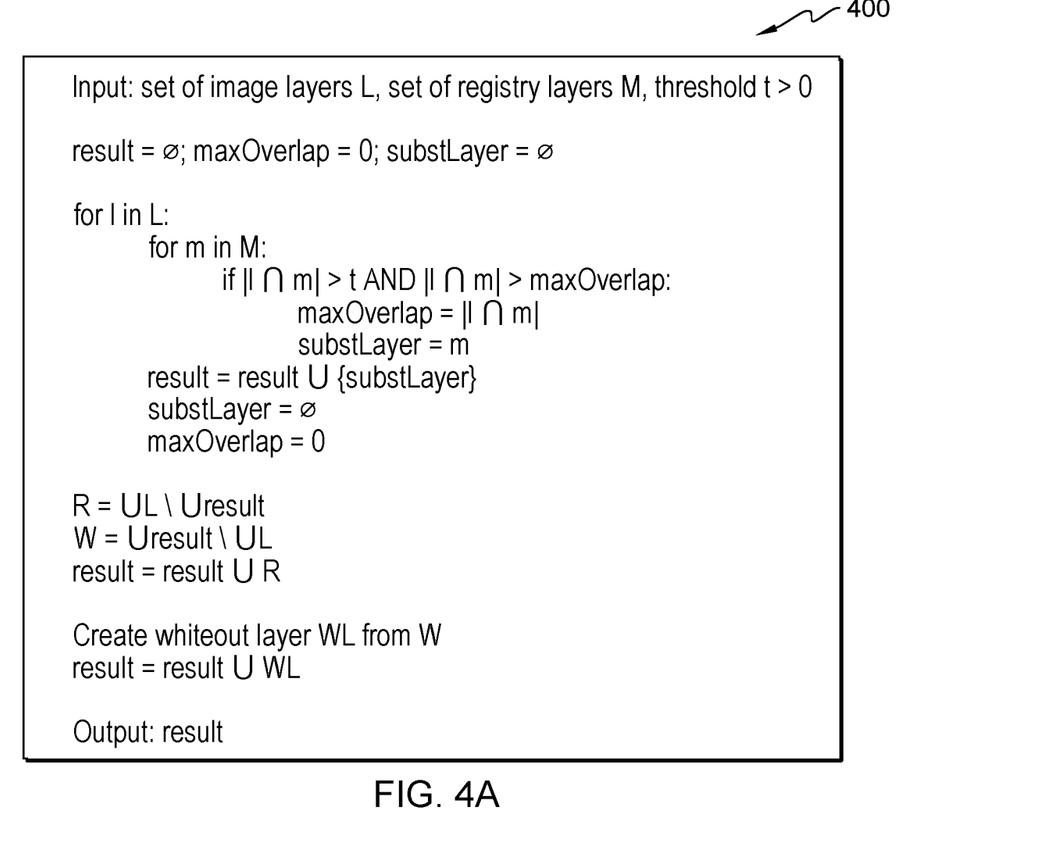
FIG. 4A illustrates an exemplary algorithm utilized by a program within the data processing environment of FIG. 1, in accordance with an embodiment of the present invention.

Program 150 calculates layer overlap (step 206). Program 150 compares each layer in the set of identified layers, as detailed in step 204, to each layer contained in each image in a repository or image registry (e.g., registry 122). In an embodiment, program 150 calculates a layer overlap score (e.g., value, rank, etc.) for each identified or decomposed layer in the detected container image based on the similarity (i.e., layer intersection) of said layer to another layer. In this embodiment, similarity can be calculated by the percentage of like files present in both layers. For example, if a layer is an exact copy of another layer, then said layers have 100% similarity or a layer overlap score of 100%. Layer intersection needs to be computed, at least, utilizing file name and file contents. FIG. 4A demonstrates an example algorithm utilized to compare each layer of the image (e.g., the set of image layers) to each layer in a repository (e.g., the set of layers in the repository) and return the layer with the greatest amount of layer overlap (e.g., sharing reusability). In an embodiment, program 150 utilizes an algorithm (e.g., FIG. 4A) to greedily (e.g., local best choice is the best global choice) to select the layer with the largest overlap in each pass or iteration. In other embodiments, program 150 utilizes said algorithm to thriftly select the layer with the largest overlap. For example, program 150 may select overlaps that locally are not the largest but, in the aggregate, provide the largest container (e.g., all the layers combined) shareability. In another embodiment, program 150 utilizes special values or parameters to allow special situations such as a "|m|" parameter which causes program 150 to avoid whiteout files by only matching the entire existing layer and a "|l|" parameter which causes program 150 to avoid splitting newly created layers.

In an embodiment, program 150 identifies all subfiles and subfolders contained within the file structures of layers (e.g., container) and creates one or more sets of file structure information such as filenames, folder names, parent folders, subfolders, associated permissions, creation dates, modified dates, symbolic links, file sizes, folder sizes, file types, hidden files, hidden folders, associated inodes and v-nodes, etc. In an embodiment, program 150 deconstructs the files into one or more sets of file contents, each containing a header (contains timestamps, file types, ownership, access control lists, reference counts, etc.) and file information blocks. In another embodiment, program 150 recursively iterates through every folder contained in or associated with a container. In this embodiment, program 150 begins at the root folder (e.g., "/") and recursively follows each subfolder down to the its "leaves" or instances where no subfolders exist. Program 150 records each iteration, including associated information and metadata, developing a map of the file structure of the container. Responsive to program 150 completing the recursive operation, program 150 stores all the recorded information into layer metadata store 124. In an embodiment, program 150 maintains a cache that temporary stores layers and layers files that can be compared to in-progress files, allowing program 150 to avoid processing layers stemming from previously scanned or processed layers or containers utilizing common base images.

In various embodiments, program 150 searches through all the folders and files contained within a layer and compares the associated file and folder information and metadata with layers contained within registry 122 and associated information and metadata contained within layer metadata store 124. In an embodiment, program 150 compares the files and filesystem structure information of one or layers contained within the detected image, as detailed in step 202, with entries located within registry 122 and layer metadata store 124. In this embodiment, program 150 may compare any combination of the following attributes: filenames, folder names, parent folders, subfolders, associated permissions, creation dates, modified dates, symbolic links, file sizes, folder sizes, and file types, to determine the similarity (e.g., overlap) of a plurality of layers, plurality of sets of layers, or plurality of containers. Program 150 utilizes the filesystems of a plurality of layers to calculate and determine a layer overlap score for each pair of layers. In an embodiment, program 150 creates a plurality of decisions trees (e.g., a tree for each set of layers), where each tree splits when a layer is created, added, or modified. In this embodiment, each decision tree branch can be shared with other similar decision trees. Program 150 may utilize said trees to calculate and determine the layer stack (e.g., branch) that has the greatest amount of layer reusability or shareability.

Program 150, then, presents, displays, or prompts a user with one or more layer suggestions (e.g., potential layer substitutions, opportunities for increased layer shareability, etc.). In an embodiment, the layer suggestion contains information regarding the suggested layer substitute, the effect the substitute will have on other layers, details regarding expected container/host performance, and possible layer ramifications such as security considerations and potential broken file dependencies. In an embodiment, program 150 notifies or prompts the user for a response (e.g., layer selection). In other embodiments, program 150 presents a maintained list of all layer suggestions along with associated information. In an alternative embodiment, program 150 only presents layer suggestions that exceed the layer overlap threshold. In various embodiments, program 150 presents a maintained list of all identified layers, including previously skipped or modified layers. In another embodiments, program 150 displays the calculated layer overlap score for each layer suggestion. In these embodiments, program 150 presents the list of modified layers to one or more users through a graphical user interface (not depicted). Said graphical user interface may exist on a utilized computing device (not depicted), allowing the user to modify the layers due to errors, corrections, or changes in the image. In another embodiment, program 150 presents the list through the command line, stdout, or terminal view of the host system. In various embodiments, program 150 ranks all the layers based on calculated layer overlap scores.

In various embodiments, program 150 may generate, adjust, modify, and/or transform the appearance of a plurality (e.g., group consisting of) of stylistic elements of messages, comments, and/or discussions. In an embodiment, said plurality may include; adjustments to font, font size, character style (e.g., bold, italics, font color, background color, superscript, subscript, capitalization, etc.), general transparency, relative transparency, etc. For example, program 150 applies a "bold" adjustment to a high layer overlap suggestion. In another embodiment, program 150 applies an adjustment to all layer suggestions that do not meet or exceed the layer overlap threshold. For example, if program 150 determines that all but one suggestion exceeds the threshold, then program 150 increases the transparency of said suggestions, placing the high overlap suggestion in a position of prominence compared to the low overlap suggestions. In various embodiments, program 150 may display the generated layer overlap score, as a numerical score, or rating. In this embodiment, program 150 displays the rating in proximity to the corresponding suggestion.

Program 150 may pause or suspend until a user response or layer selection is received. In an embodiment, program 150 maintains a timeout function or threshold that controls how long program 150 waits, suspends, or pauses for the user response. In this embodiment, if the user does not respond within a specified duration, then program 150 automatically selects (e.g., determines, ranks and selects, etc.) the layer with the highest layer overlap or the highest ranked suggestion.

If the layer overlap exceeds an overlap threshold ("yes" branch, decision 208), then program 150 substitutes the layer (step 210). Program 150 utilizes a layer overlap threshold to control the size of potential subsequent substitute layers. In an embodiment, program 150 utilizes the threshold to control algorithmic aggressiveness. In another embodiment, program 150 utilizes a small layer overlap threshold to allow smaller substitute layer (e.g., creates many sharable layers) or program 150 utilizes a large layer overlap threshold to only allow larger substitute layers (e.g., creates a few sharable layers). For example, larger thresholds signify less aggressive layer consolidation, while smaller thresholds increase layer reuse at the expense of the possibility of smaller individual layers. In an embodiment, program 150 dynamically adjusts the layer overlap threshold based on a plurality of factors including, but not limited to, container size, container type, average layer size, size of the layer that has the highest layer overlap score, and image repository requirements and specifications. In an embodiment, the user specifies the threshold value. In other embodiment, the container, host, system, and/or production server requirements/purpose dictates the threshold value. For example, an exemplary production server may only have sufficient computational storage for a small container (e.g., >500 megabytes). In this example, program 150 adjusts the threshold to allow for many small layers that increase the level of shareability but increases overhead to conform with the requirements of the production server. In an embodiment, if the user selected a layer that does not exceed the layer overlap threshold, then program 150 may, dynamically or temporarily, reduce the threshold to allow the layer selection to proceed. In an additional embodiment, program 150 notifies, prompts, or sends a confirmation, requesting that the user confirm the layer selection.

Program 150 utilizes the selected layer (e.g., highest ranked layer (i.e., highest layer overlap score)), as detailed in step 206, as a substitute layer (e.g., read-only shared layer). In an embodiment, program 150 replaces the file structure associated with a shared layer with links (e.g., layer links, container links, symbolic links, etc.) to shared layers and file structures. The substitute layer contains a file structure (e.g., sets of files and folders) corresponding with a file structure of an existing shared layer in registry 122. Program 150 removes all related (e.g., not associated with a substitute layer) folders and files associated with said file structure and adds/moves (e.g., including removing said files from the substitute layer) all missed files and layers to a leftover layer (e.g., whiteout layer). Program 150 creates said whiteout layer to mask all additional, unused files. In an embodiment, program 150 only utilizes filenames when computing layer intersections due to whiteout files being name based (i.e., files with the same name as the whiteout will be hidden). Mistakenly removing necessary files in a leftover layer may create problems if said files are referenced by lower layers (e.g., files referenced by many programs, functions, and applications). Program 150 performs extra checks and tests to ensure that all files exist in the final restructured image. In an embodiment, program 150 utilizes test cases to verify that all required files exist and, in turn, ensure container functionality. Responsive to the creation of a substitute layer and a leftover layer, program 150 rearranges, automatically, one or more layers to maximize layer reusability. In an embodiment, program 150 may modify, replace, swap, or delete any subordinate (e.g., previous, below, etc.) layer in an image. For example, program 150 swaps two layers to maximize layer reusability and shareability. In this example, program 150 runs a plurality of file structure and functionality tests to verify that no references or dependencies were severed. In an embodiment, the substitute layer is shared or linked to one or more sets of associated If the layer overlap does not exceed an overlap threshold ("no" branch, decision 208), then program 150 pushes the image into the registry (step 214). Responsive to program 150 determines that no layer, with associated calculated layer overlap score, exceeds the layer overlap threshold, then program 150 pushes the image into the registry, as detailed below in step 214.

If there is a leftover ("yes" branch, decision 212), then program 150 compares image layers to layers in registry (step 204). Program 150 determines whether there are left over files or layer(s) (e.g., leftover layer or whiteout layer) that was unaccounted for in the previous layer intersection (e.g., iteration). If program 150 determines that there is a leftover layer or files, then program 150 inputs said leftover layer into step 204. For example, program 150 utilizes the leftover layer (e.g., remainder layer, whiteout layer, remaining software and files) as a new input and then initiates the process to calculate new layer overlap scores based on the inputted leftover layer. Program 150 utilizes decision 212 as a recursive function allowing program 150 to run recursively until all layers exceeding the layer overlap threshold are processed. This recursive element ensures that subsequent leftover layers and associated files are matched to existing layers within the registry.

If there is not a leftover layer ("no" branch, decision 208), then program 150 pushes image to registry (step 214). Responsive to program 150 determining that there is no leftover file or layer (e.g., each file in the set of layers is associated with a shared layer (e.g., substitute layer)), program 150 pushes the image into the registry, as detailed below in step 214.

Program 150 pushes the image into the registry (step 214). Program 150 pushes, transmits, or stores the resulting image (e.g., optimized, modified, restructured, etc.), detailed in the above steps, into registry 122 or one or more image repositories. In an embodiment, program 150, automatically, deploys the modified image to another host or cluster of hosts. In an embodiment, program 150 utilizes the identified and processed shared layers to identify and retrieve information and solutions for one or more security vulnerabilities present in one or more layers within the image. For example, program 150 reports that database layer contained in a modified image is out of date and is can be exploited by a plurality of security vulnerabilities. In an embodiment, program 150 patches the layer (e.g., images) with respective vulnerability patches or fixes based on the identified vulnerabilities. In this embodiment, program 150 adjust the file structure of a layer based on the modifications (e.g., patches, hardening, etc.). In various embodiments, program 150 automatically hardens a container after vulnerable image layers have been identified. In this embodiment, program 150 retrieves and utilizes best practices associated with the software or the type of software associated with the image. For example, if program 150 identifies a webserver on an image, then program 150 may implement default practices on the image that restrict the public viewing of the root folder of the webserver. Program 150 updates layer metadata store 124 with metadata generated from the operations detailed above. In an embodiment, program 150 stores the hashes generated from calculating layer intersection and creating substitute layers. In an embodiment, the updated metadata includes, but is not limited to, related layers, software, containers, filenames, folder names, parent folders, subfolders, associated permissions, creation dates, modified dates, symbolic links, file sizes, folder sizes, file types, hidden files, hidden folders, associated inodes and v-nodes.

Figure 3:
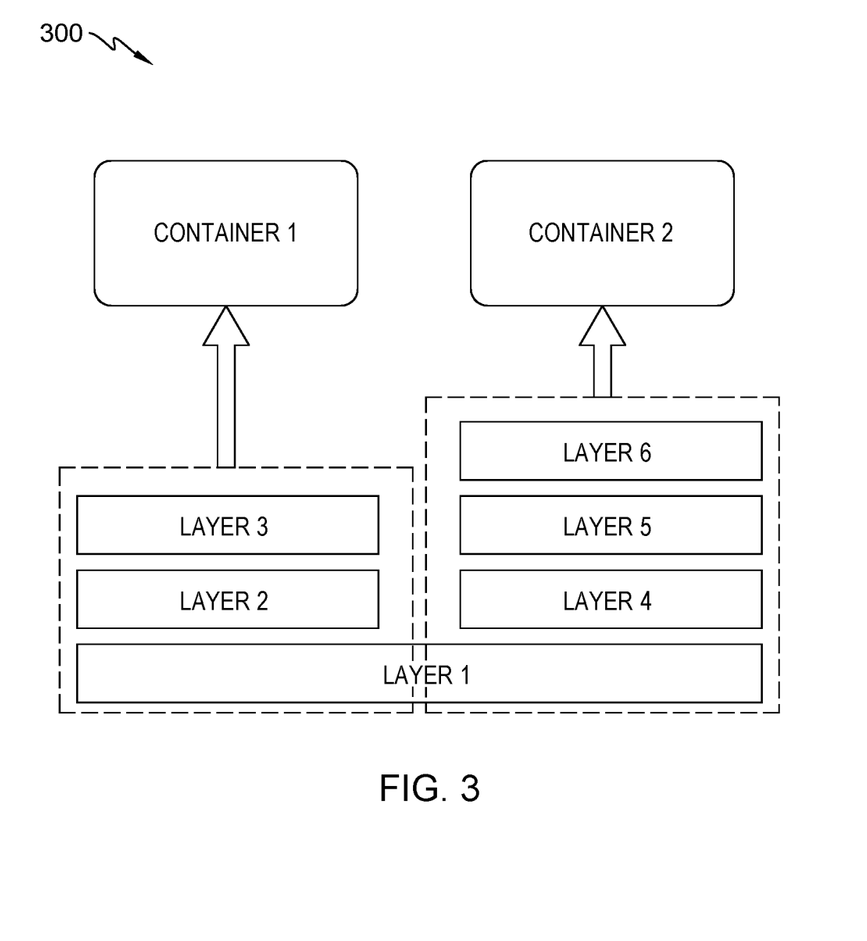
FIG. 3 depicts an example optimization that includes automatic layer suggestions, in accordance with an embodiment of the present invention.

FIG. 3 depicts an example optimization that includes automatic layer suggestions, in accordance with an embodiment of the present invention. FIG. 3 contains two containers each sharing a base layer (e.g., read-only layer 1). In an embodiment, this base layer contains the container operating system and associated system tools. In this embodiment, program 150 identifies (e.g., pre-existing or restructured) 3 layers for container 1 and 4 layers for container 2 and extracts associated metadata such as layer, file, and folder hashes. Program 150 compares each layer and calculates a layer overlap score for each compared layer pair. In this example, program 150 calculates a high layer overlap for layer 1 in both containers and determines layer 1 as a substitute layer. In an embodiment, program 150 utilizes the algorithm depicted in FIG. 4 to determine and select a substitution layer. In an alternative embodiment, program 150 presents the layer suggestion and allows a user to accept, modify, or deny the suggestion. Program 150, then, automatically restructures both containers based on shared layer 1 (e.g., substitute layer) and any leftover layers (e.g., whiteout layers).

FIG. 4A illustrates algorithm 400, an algorithm utilized by a program in accordance with an embodiment of the present invention. Algorithm 400 is utilized to compare each layer of the image (e.g., the set of image layers) to each layer in a repository (e.g., the set of layers in the repository) and return the layer with the greatest amount of layer overlap (e.g., sharing reusability). One iteration of algorithm 400 has a complexity of $O(|L||M| x)$, where L is a set of image layer, M is a set of registry layers, and x represents the amount of time needed to compute a layer intersection (e.g., layer overlap score). Layer intersection can be computed in $O(|l|+|m|)$. All following iterations can run in $O(|M| x)$.

Figure 4B:
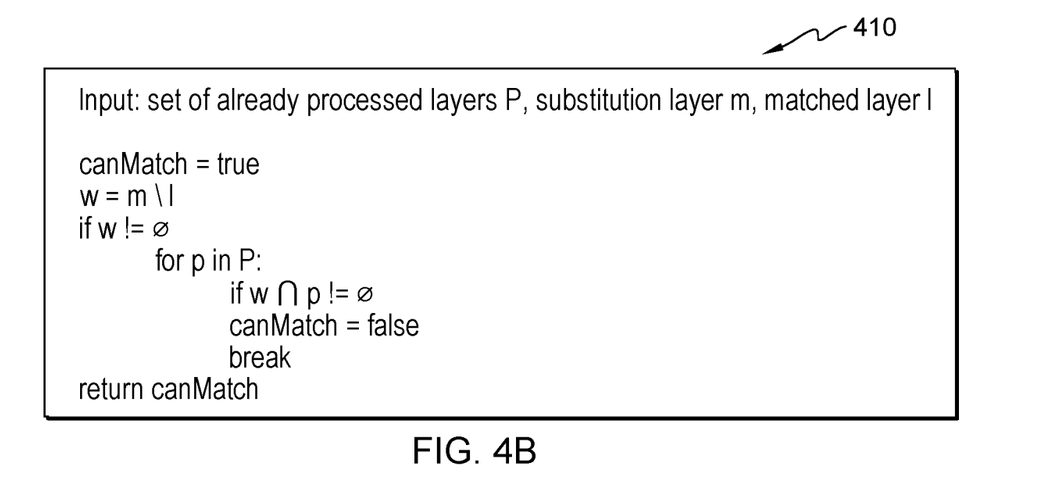
FIG. 4B illustrates an exemplary algorithm utilized by a program within the data processing environment of FIG. 1, in accordance with an embodiment of the present invention.

FIG. 4B illustrates algorithm 410, an algorithm utilized by a program in accordance with an embodiment of the present invention. Algorithm 410 is utilized to check processed layers with substitution layers and associated matched layers. Algorithm 410 has a runtime complexity of $O(|P| x)$, where P is a set of processed layers and x represents the amount of time needed to compute a layer intersection.

Figure 5:
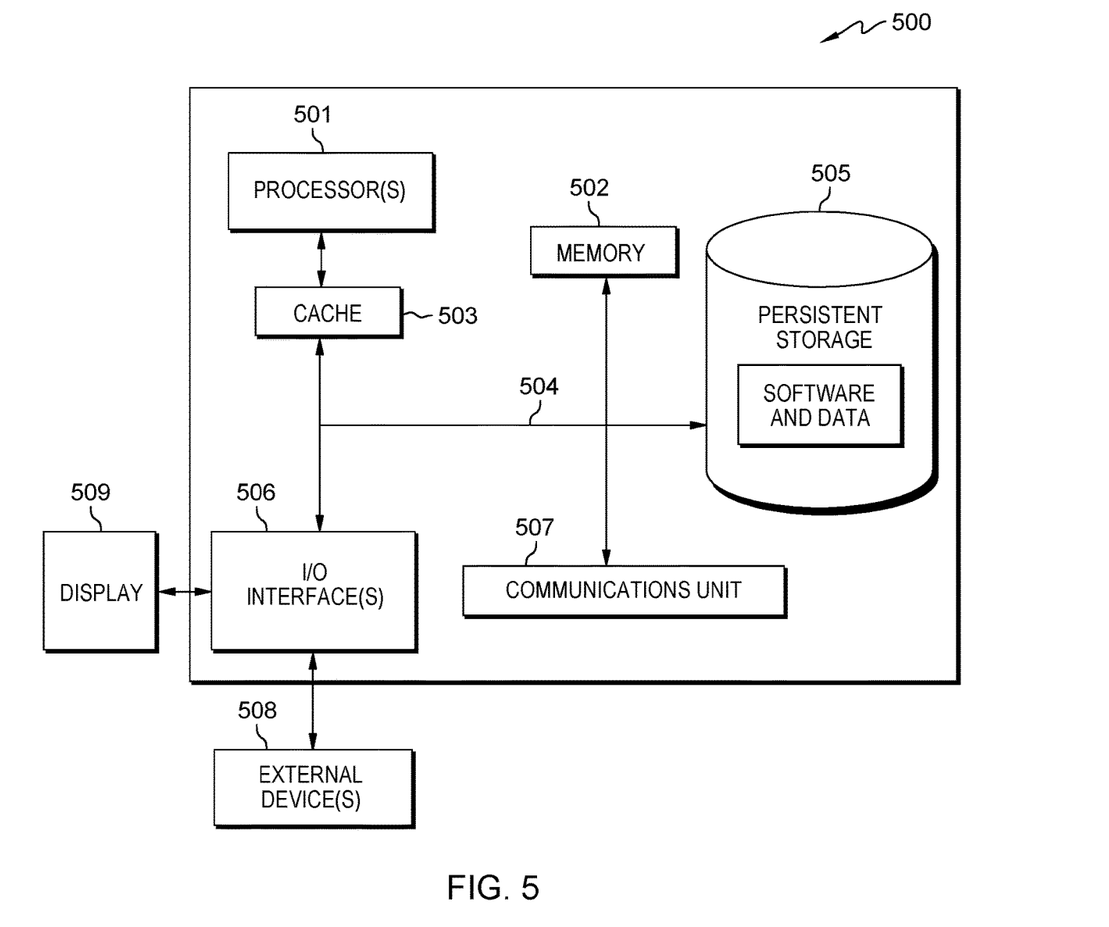
FIG. 5 is a block diagram of components of computing device and server computer, in accordance with an embodiment of the present invention.

FIG. 5 depicts a block diagram of components of computing device 110 and server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and server computer 120 includes communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected, respectively, to computing device 110 and server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying, by one or more computer processors, one or more layers contained within an image;
comparing, by one or more computer processors, each identified layer with one or more layers contained in an image repository;
calculating, by one or more computer processors, a layer overlap score for each compared layer;
determining, by one or more computer processors, a potential substitute layer utilizing a respective calculated layer overlap score;
responsive to the determined substitute layer exceeding a layer overlap score threshold, substituting, by one or more computer processors, one or more identified layers with the determined substitute layer; and
restructuring, by one or more computer processors, one or more layers of the image based on the substituted layer.

2. The method of claim 1, wherein determining the potential substitute layer utilizing the calculated layer overlap score, comprises:
   presenting, by one or more computer processors, one or more suggested potential layer substitutions; and
   responsive to a user selecting a suggested layer substitution, substituting, by one or more computer processors, one or more identified layers with the user selected substitute layer.

3. The method of claim 2, wherein presenting the one or more suggested layer substitutions, comprises:
   transforming, by one or more computer processors, one or more stylistic elements of each presented layer substitutions based on a respective layer overlap score, wherein stylistic elements are selected from the group consisting of: font, font size, character style, font color, background color, capitalizations, general transparency, and relative transparency; and
   presenting, by one or more computer processors, the transformed one or more stylistic elements.

4. The method of claim 1, further comprising:
   adjusting, by one or more computer processors, dynamically, the layer overlap threshold based on one or more factors selected from the group consisting of, container size, container type, average layer size, and size of a layer that has the highest layer overlap score.

5. The method of claim 1, wherein substituting one or more identified layers with the determined substitute layer, comprises:
   moving, by one or more computer processors, one or more files and folders, not associated with the determined substitute layer, to a whiteout layer.

6. The method of claim 1, wherein restructuring, by one or more computer processors, one or more layers of the image based on the substituted layer comprises:
   sharing, by one or more computer processors, one or more files and folders associated with the substitution layer.

7. The method of claim 1, wherein restructuring one or more layers of the image based on the substituted layer, comprises:
   applying, by one or more computer processors, one or more test cases verifying container functionality.

8. The method of claim 1, further comprising:
   pushing, by one or more computer processors, the restructured image to one or more image repositories.

9. The method of claim 1, further comprising:
   updating, by one or more computer processors, a layer metadata store.

10. A computer program product comprising:
    one or more computer readable storage media and program instructions stored on the one or more computer readable storage media, the stored program instructions comprising:
    program instructions to identify one or more layers contained within an image;
    program instructions to compare each identified layer with one or more layers contained in an image repository;
    program instructions to calculate a layer overlap score for each compared layer;
    program instructions to determine a potential substitute layer utilizing a respective calculated layer overlap score;
    program instructions to, responsive to the determined substitute layer exceeding a layer overlap score threshold, substitute one or more identified layers with the determined substitute layer; and
    program instructions to restructure one or more layers of the image based on the substituted layer.

11. The computer program product of claim 10, wherein the program instructions, to determine the potential substitute layer utilizing the calculated layer overlap score, stored on the one or more computer readable storage media comprise:
    program instructions to present one or more suggested potential layer substitutions; and
    program instructions to, responsive to a user selecting a suggested layer substitution, substitute one or more identified layers with the user selected substitute layer.

12. The computer program product of claim 10, wherein the program instructions, to present the one or more suggested layer substitutions, stored on the one or more computer readable storage media comprise:
    program instructions to transform one or more stylistic elements of each presented layer substitutions based on a respective layer overlap score, wherein stylistic elements are selected from the group consisting of: font, font size, character style, font color, background color, capitalizations, general transparency, and relative transparency; and
    program instructions to present the transformed one or more stylistic elements.

13. The computer program product of claim 10, wherein the program instructions stored on the one or more computer readable storage media comprise:
    program instructions to adjust, dynamically, the layer overlap threshold based on one or more factors selected from the group consisting of, container size, container type, average layer size, and size of a layer that has the highest layer overlap score.

14. The computer program product of claim 10, wherein the program instructions, to substitute one or more identified layers with the determined substitute layer, stored on the one or more computer readable storage media comprise:
    program instructions to move one or more files and folders, not associated with the determined substitute layer, to a whiteout layer.

15. The computer program product of claim 10, wherein the program instructions, to wherein restructure one or more layers of the image based on the substituted layer, stored on the one or more computer readable storage media comprise:
    program instructions to share one or more files and folders associated with the substitution layer.

16. A computer system comprising:
    one or more computer processors;
    one or more computer readable storage media; and
    program instructions stored on the computer readable storage media for execution by at least one of the one or more processors, the stored program instructions comprising:
    program instructions to identify one or more layers contained within an image;
    program instructions to compare each identified layer with one or more layers contained in an image repository;
    program instructions to calculate a layer overlap score for each compared layer;
    program instructions to determine a potential substitute layer utilizing a respective calculated layer overlap score;
    program instructions to, responsive to the determined substitute layer exceeding a layer overlap score threshold, substitute one or more identified layers with the determined substitute layer; and program instructions to restructure one or more layers of the image based on the substituted layer.

17. The computer system of claim 16, wherein the program instructions, to determine the potential substitute layer utilizing the calculated layer overlap score, stored on the one or more computer readable storage media comprise:

program instructions to present one or more suggested potential layer substitutions; and program instructions to, responsive to a user selecting a suggested layer substitution, substitute one or more identified layers with the user selected substitute layer.

18. The computer system of claim 16, wherein the program instructions, to present the one or more suggested layer substitutions, stored on the one or more computer readable storage media comprise:

program instructions to transform one or more stylistic elements of each presented layer substitutions based on a respective layer overlap score, wherein stylistic elements are selected from the group consisting of: font, font size, character style, font color, background color, capitalizations, general transparency, and relative transparency; and program instructions to present the transformed one or more stylistic elements.

19. The computer system of claim 16, wherein the program instructions stored on the one or more computer readable storage media comprise:

program instructions to adjust, dynamically, the layer overlap threshold based on one or more factors selected from the group consisting of, container size, container type, average layer size, and size of a layer that has the highest layer overlap score.

20. The computer system of claim 16, wherein the program instructions, to substitute one or more identified layers with the determined substitute layer, stored on the one or more computer readable storage media comprise:

program instructions to move one or more files and folders, not associated with the determined substitute layer, to a whiteout layer.

* * * * *